United States Patent [19]
Eck

[11] 3,807,296
[45] Apr. 30, 1974

[54] APPARATUS FOR REMOVING WASTE MATERIAL

[75] Inventor: Walter Eck, Munich, Germany

[73] Assignee: Siemens-Electrogerate GmbH, Berlin, Germany

[22] Filed: June 19, 1972

[21] Appl. No.: 263,852

[30] Foreign Application Priority Data
June 18, 1971 Germany............................ 2130231
June 18, 1971 Germany............................ 2130230

[52] U.S. Cl..................... 100/74, 100/91, 100/94, 100/102, 100/215, 100/229 A, 209/106, 209/115, 241/60, 241/62, 241/101.2, 241/143
[51] Int. Cl............................................. B30b 15/30
[58] Field of Search.............. 83/39, 70; 100/71, 73, 100/74, 75, 94, 95, 96, 97, 229 A, 215, 102, 91; 241/101.2, 143, 44, 60, 62; 209/106, 115

[56] References Cited
UNITED STATES PATENTS

| | | | |
|---|---|---|---|
| 2,105,759 | 1/1938 | Stevenson | 241/60 X |
| 2,059,229 | 11/1936 | Gregg | 100/39 |
| 3,537,390 | 11/1970 | Hinkel et al. | 100/229 X |
| 3,604,345 | 9/1971 | Boje | 100/71 |
| 2,594,054 | 4/1952 | McNamara et al. | 100/91 |
| 3,363,847 | 1/1968 | Joa | 241/62 X |
| 3,547,577 | 12/1970 | Louercheck | 100/70 |
| 3,604,179 | 9/1971 | Lund | 100/39 X |

Primary Examiner—Billy J. Wilhite
Attorney, Agent, or Firm—Kenyon & Kenyon Reilly Carr & Chapin

[57] ABSTRACT

An apparatus for disposing of waste materials, of either a commercial or household type, wherein the waste materials are separated for either compacting or discharge into a sewage system. Prior to discharge, a portion of the waste products are crushed and stored in a container provided in the apparatus, which container is connected to the sewage system. The remaining portion of the waste materials or the non-decomposable waste material is separated in another compartment from that being crushed so that it may be compacted and disposed of or forwarded to an appropriate treatment facility for possible recycling.

9 Claims, 3 Drawing Figures 3,807,296

APPARATUS FOR REMOVING WASTE MATERIAL

BACKGROUND OF THE INVENTION

This invention relates generally to an apparatus for removing waste materials, and more particularly to one wherein waste materials are separated into basically decomposable and non-decomposable types, the former being disposed of through available sewage systems while the latter is compressed into a compact package.

It is heretofore known to use different types of waste disposal systems, some of which require that prior to grinding, certain large items or those items difficult to grind, be separated from the remaining waste materials. Heavier and more ruggedly designed units sometimes are capable of handling and grinding all of the waste materials introduced. Even when this rugged type unit is used, it presents problems in that not only is the biologically decomposable waste introduced into the sewer system, but along with it is also introduced the non-decomposable constituents. The sewage treatment facilities are thereby severely strained by these constituents which are not biologically decomposable.

By the means disclosed herein, an apparatus is provided wherein waste products generated either in the household or in commercial establishments can be disposed without overburdening the available sewage systems. Furthermore, the apparatus of this invention provides for an effective disposal of certain waste products into the sewage system while those that cannot readily be accommodated therein are segregated and disposed of elsewhere.

SUMMARY OF THE INVENTION

Briefly stated, the apparatus provided herein includes a chute through which the waste products are placed in the disposal apparatus and passed onto a grinding means disposed adjacent thereto. The grinding means includes a plurality of rotatable members which are spaced from one another so that the waste products are ground and crushed between adjacent members and dropped therebeneath. Beneath the rotatable members is a container adapted to receive and hold the crushed waste materials until they are ready for ultimate disposal. A coupling is provided which connects the container means to a central disposal or sewage system into which the waste materials are discharged from the apparatus.

In a more specific embodiment, the rotatable members are inclined away from the introducing means and have adjacent their lowermost end a second container means. A partition which extends slightly above the lowermost portion of the inclined rotatable members is provided between the two container means. In this manner, the waste constituents which are not ground or crushed by the rotatable members are passed to the second container which is provided with a press adapted to compact those waste materials deposited therein. Preferably the rotatable members are cone shaped and positioned such that the larger diameter is adjacent the smaller diameter of the member cooperating therewith. Furthermore, it is preferable to have a means for introducing water into the container so that the biologically decomposable waste constituents can be floated while awaiting discharge into the sewage system. The means for introducing the water into the apparatus is preferably waste water which is recirculated in the container although it may be fresh water introduced from an outside source.

Usage of the apparatus of this invention is advantageous in that the waste which is readily biologically decomposable is discharged into the sewage system without loading the treatment plants with components that are difficult or impossible to decompose. Volume-wise, the waste which is conventionally removed by vehicles is reduced since certain components are disposed of in the sewer system while the remainder is substantially compressed by compacting. Furthermore, the compressed waste may be delivered to facilities most appropriate for the particular composition since a certain amount of sorting has already taken place.

Accordingly, it is an object of this invention to provide an apparatus which is adapted to segregate the waste materials introduced therein.

It is another object of this invention to provide a simple and effective waste disposal system wherein the constituents of the waste materials are separated into those which can be accepted by available sewage systems while the remainder is compressed into a compact package.

The objects of this invention are accomplished by crushing the refuse and then storing it in a container which is connected to a sewage system. The container is discharged into the sewage system at a predetermined time either individually or in groups which may also be accomplished from a central control station. By the means disclosed herein, it is also possible to control the discharge of waste material dependent on the respective loads of the sewer networks. While the refuse material is being held for discharge into the sewage system, it is preferred to float the wastes stored in the containers. This can be accomplished either by the introduction of fresh water or preferably with waste water which is at least partially recirculated in the container.

In certain instances, it is advantageous to provide the container or collecting tank with a means for storing at least part of the accumulated waste water. An overflow pipe which opens into the discharge line behind the outlet valve is then provided in the collecting tank.

Particularly favorable flushing or discharge of the ground waste is obtained if, according to a further embodiment of the invention, at least one inlet opening for fresh water, which is operable by a valve, is disposed in the bottom portion of the collecting tank. In this manner, fresh water is admitted into the collecting tank for flushing out the waste along with the sediment at the bottom of the container.

Usage of a circulating pump connected to the collecting tank which contains, in addition to the comminuted garbage, also waste water, makes the need for fresh water substantially unnecessary. The pressure side of a circulating pump is connected to the bottom region of the interior of the tank, while the pump intake line is connected to the upper portion of the collecting tank at a point below the overflow pipe. In this manner, the sediment formed by the garbage can be flushed upwardly by means of the circulation of the waste water contained in the collecting tank.

Regardless of whether fresh water or circulated waste water is used for the upward flushing of the waste, it is advantageous to position in the collecting tank a distribution screen which preferably extends over the entire bottom area. In this manner, the water flows into the collecting tank and is distributed over the entire bottom area.

A particularly compact design of the garbage disposal equipment according to the invention is obtained if the grinder, the container or collecting tank and the compacting press are placed in a common housing, the dimensions of which conform to customary household appliances. The development of obnoxious odors or other effects injurious to health caused by the garbage deposited in the collecting tank or in the press chamber of the compacting press are avoided if in the housing of the garbage disposal equipment, preferably above the grinder, a disinfectant dispenser is arranged. The dispenser may be controlled so that the newly deposited garbage is treated with disinfectant just after it is placed in the garbage disposal equipment.

These and other objects, advantages and features of the invention will become more apparent from the following description taken in conjunction with the accompanying drawings.

DESCRIPTION OF THE PREFERRED EMBODIMENT

Figure 1:
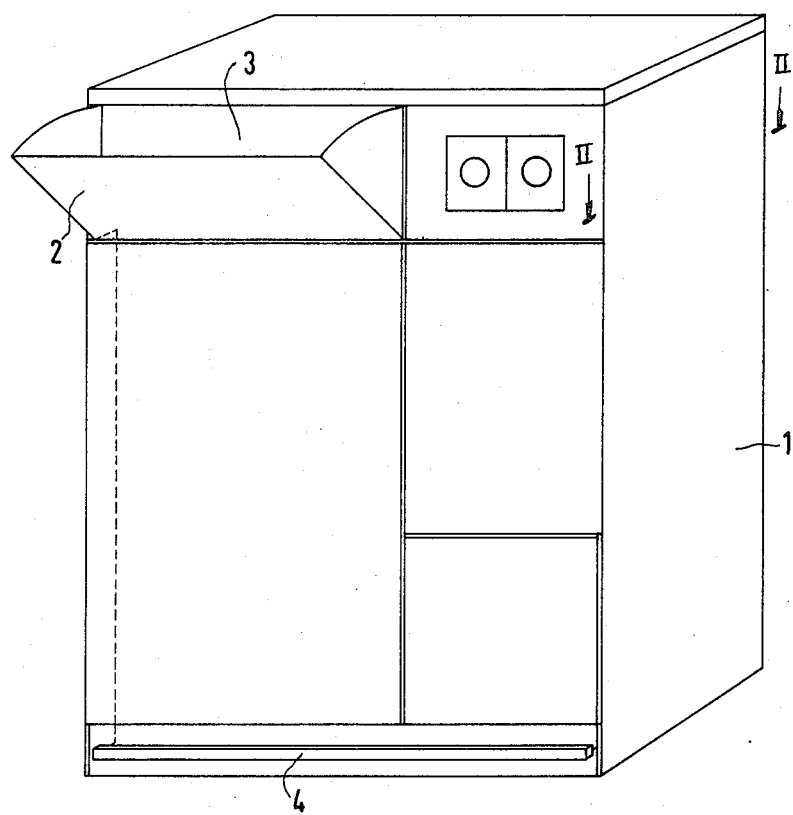
FIG. 1 is a perspective view of the apparatus of this invention.

With reference to the drawings, the waste disposal unit 1 includes on the front panel a hinged chute 2 which has an opening 3 and is operable by means of a floor switch 4 connected thereto by means of an appropriate linkage. The waste materials introduced into the chute opening 3, pass to a sorting chamber which has at its lower portion crushing or grinding equipment 6. The crushing or grinding equipment 6 includes a plurality of tapered cones 5, the illustrated number being five, which are inclined away from the chute opening 3. In this manner, bulky items as well as those items which are not readily biologically decomposable will move along the inclined surface of the cones 5 and over the gate edge 11 of partition 9 through the opening denoted as 10. This bulk material then passes into another container or chamber 8 where the material is crushed or compacted by the descending press 7. The bulk material is compressed or compacted into a pile which is within a bag 12 so that easy removal from the compression chamber 8 may be accomplished. The lower portion of chamber 8 is designed in the manner of a drawer to allow for ready removal of the compacted waste.

Figure 2:
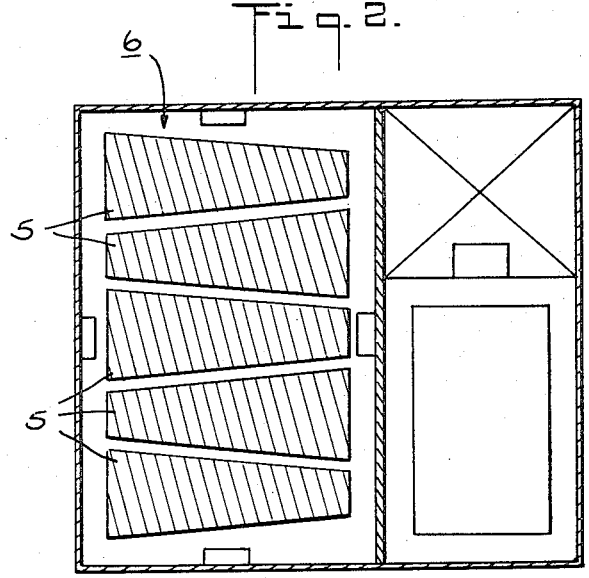
FIG. 2 is a top cross-sectional view of the apparatus of this invention taken along the line II—II of FIG. 1.
Figure 3:
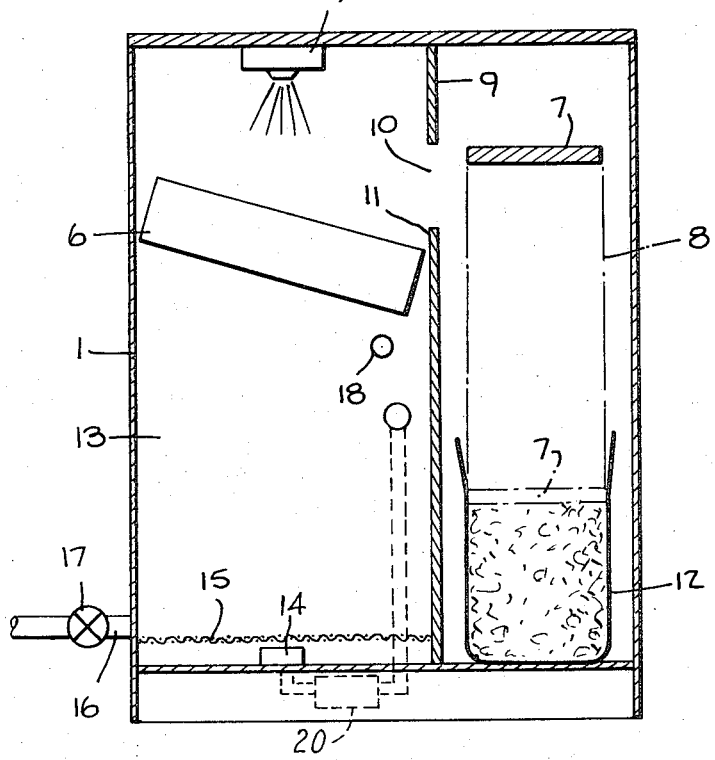
FIG. 3 is an elevation view partially in cross-section of the apparatus of FIG. 1 with the front panel removed.

The tapered cones are positioned adjacent one another in the manner illustrated in FIG. 2, namely the larger diameter is positioned adjacent to the smaller diameter of the adjacent cone. Spacing between the cones 5 is such that the material is appropriately crushed when the cones are rotated. The constituents of the waste material which can be crushed or ground passes through the cones 5 into the container or collecting tank 13 disposed therebeneath.

At the lower portion of the collecting tank 13, is a fresh-water inlet 14 controlled by a valve (not shown). Above inlet 14 is a distribution screen 15 extending over the entire bottom area of the collecting tank 13. In the upper region of the collecting tank 13, is an overflow pipe 18 which is connected into the discharge line 16 upstream of the outlet valve 17. A disinfectant dispenser 19 is also provided above the grinder 6.

The garbage inserted in the opening 3 first arrives at the grinding cones 5 of the grinder 6 which are inclined toward the compacting chamber 8 and which pick up and comminute the easily decomposable components of the garbage which as a rule consist of organic substances while the garbage consisting of components which are not or only slightly decomposable, such as for instance, bottles, cans and the like, is carried from the grinding cones 5 through the connecting opening 10 over the gate 11 into the press chamber 8. Prior to or during this process, the garbage is treated with disinfectant from the disinfectant dispenser 19. The garbage crushed by the grinder 6 passes into the collecting tank 13, in the bottom region of which a water sump is situated. At a predetermined time or through a remote control signal, fresh water is first fed into the collecting tank 13 via the valve 14, so that the garbage sludge that has settled at the bottom is flushed upwardly. Subsequently, the valve 17 is opened and the contents of the collecting tank 13 are carried into the existing sewer system via the discharge line 16.

In a garbage disposal system which is designed to receive waste water, the fresh water connection may be omitted. In its place is the pressure line of the circulating pump 20 the intake line of which is connected to the upper portion of the collecting tank 13 at a point below the opening of the overflow pipe 18. The garbage that has settled at the bottom of the collecting tank 13 is flushed upwardly in this case by the waste water delivered by the circulating pump. The garbage arriving in the press chamber 8 is compressed in the customary manner by the compacting press 7 and can be removed from the drawer 12 as a convenient compact package.

As described in my copending U.S. Pat. application, Ser. No. 263,851, entitled METHOD AND APPARATUS FOR REMOVING WASTE, filed on even date herewith, pipe connection 16 includes valve 17 which is preferably a solenoid type valve controllable either by a timing clock or signals from a central control station. In the latter situation, the signals are preferably superimposed on the frequencies of the available power supply systems. Prior to discharge of the waste materials from container 13, the crushed waste stored therein is preferably floated either by circulating the waste water which is also contained in the container 13 or by introducing additional fresh water. Once the valve 17 is open, the waste mixed with water is introduced via connecting line 16 into the sewage system while the discharge time can be adjusted for the respective station and particularly with respect to the loading of the local sewer network.

Although the above description is directed to a preferred embodiment of the invention, it is noted that other variations and modifications will be apparent to those skilled in the art and, therefore, may be made without departing from the spirit and scope of the present disclosure.

What is claimed is:

1. A waste disposal apparatus which comprises means for introducing the waste material into the apparatus, means for separating the waste material into a type which is biologically decomposable and a type which is not biologically decomposable, means for grinding the portion of the waste material which is biologically decomposable, means for compressing the portion of the waste material which is not biologically decomposable, container means disposed beneath said grinding means adapted to receive the ground biologically decomposable waste material, and coupling means having one end thereof connected to said container means and the other end thereof connected to a central sewage system into which the biologically decomposable waste material is discharged.

2. A waste disposal apparatus in accordance with claim 1 which further includes means for introducing water into said container means, and an overflow pipe connected at one end to said container means and at the other end thereof to said central sewage system.

3. A waste disposal apparatus in accordance with claim 2 which further includes a recirculating pump which has the output side thereof connected to the lower portion of said container means and the input side thereof connected to the upper portion of said container means at a point below said overflow pipe.

4. A waste disposal apparatus in accordance with claim 2 which further includes a screen disposed in said container means above said water introducing means.

5. A waste disposal apparatus in accordance with claim 1 wherein said grinding means comprises a plurality of rotatable members spaced from one another so that at least a portion of the waste being processed is crushed between adjacent rotatable members and wherein each of said rotatable members has a tapered cone-like surface and is positioned such that the axis about which rotation occurs is inclined in a downward direction away from said introducing means sufficiently to cause the material which is not crushed between said rotatable members to slide thereacross and off the lowermost portion thereof, said cone-like surfaces being arranged such that the end having the larger diameter is disposed adjacent the end having the smaller diameter of the adjacent member.

6. A waste disposal apparatus in accordance with claim 5 which further includes a disinfectant dispenser disposed above said rotatable members.

7. A waste disposal apparatus in accordance with claim 5 which further includes a second container means disposed adjacent the first container means, and a vertically extending partition separating each of said container means and which has the uppermost edge thereof adjacent the lowermost portion of said rotatable members such that objects not susceptible to crushing by said rotatable members are separated and passed to said second container means.

8. A waste disposal apparatus in accordance with claim 7 which further includes a disposable bag positioned in the lower portion of said second container means for collecting the portion of said waste material passed therein, and a movable press disposed in said second container means adapted to compress the material in said bag into a compact pile.

9. A waste disposal apparatus in accordance with claim 1 which further includes a drawer at the bottom of said compressing means to allow for easy removal of the compressed waste materials.

* * * * *